(12) United States Patent
Green et al.

(10) Patent No.: US 10,569,424 B1
(45) Date of Patent: Feb. 25, 2020

(54) DEVICE FOR GRIPPING CONTAINERS

(71) Applicant: INTELLIGRATED HEADQUARTERS, LLC, Mason, OH (US)

(72) Inventors: Todd Eliot Green, Baltimore, MD (US); Darius Scott, Baltimore, MD (US)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 0 days.

(21) Appl. No.: 16/369,635

(22) Filed: Mar. 29, 2019

(51) Int. Cl.
*B25J 15/04* (2006.01)
*B25J 15/02* (2006.01)
*B25J 15/00* (2006.01)

(52) U.S. Cl.
CPC ....... *B25J 15/0213* (2013.01); *B25J 15/0028* (2013.01); *B25J 15/0033* (2013.01)

(58) Field of Classification Search
CPC .......................... B25J 15/0213; B25J 15/0028
USPC ............................... 294/116, 106, 118, 119.1
See application file for complete search history.

(56) References Cited

U.S. PATENT DOCUMENTS

| | | | | |
|---|---|---|---|---|
| 4,105,240 A | * | 8/1978 | Steenson | B66C 1/422 294/106 |
| 5,693,113 A | * | 12/1997 | Dries | C03B 35/04 294/115 |
| 5,975,605 A | | 11/1999 | Kot | |
| 5,975,837 A | * | 11/1999 | Focke | B65G 47/90 294/119.1 |
| 6,505,870 B1 | | 1/2003 | Laliberte et al. | |
| 6,530,616 B1 | * | 3/2003 | McIntosh | B25B 5/087 294/106 |
| 7,845,698 B2 | * | 12/2010 | Jenkins | B25J 9/1005 294/115 |
| 9,073,217 B2 | * | 7/2015 | Xiao | F16H 19/005 |
| 2014/0232127 A1 | * | 8/2014 | Robertson | B66C 1/44 294/207 |

* cited by examiner

*Primary Examiner* — Paul T Chin
(74) *Attorney, Agent, or Firm* — Alston & Bird LLP (57) ABSTRACT

Various example embodiments described herein relates to a gripping device that includes a top plate, first side plate, a second side plate, a first arm, a second arm, and a driving pin. The first side plate and the second side plate are engaged to the top plate. The first arm is engaged to the first side plate and the second arm is engaged to the second side plate. The first arm defines a first cam slot, and the second arm defines a second cam slot and are constrained together, by the driving pin engaged to an actuation assembly. The driving pin is configured to move between a first position and a second position within the first cam slot and the second cam slot so as to drive movement of the first side plate and the second side plate between an open position and a closed position to grip a container.

20 Claims, 9 Drawing Sheets

DEVICE FOR GRIPPING CONTAINERS

BACKGROUND

In material handling environments, such as distribution centers, warehouses, inventories, shipping centers, and/or the like, devices such as robotic arms and/or overhead conveyor units are often used for performing various operations. For instance, these devices may be used for performing operations such as placing, stacking, un-stacking, lifting, repositioning, and relocating articles for transit. The articles referred herein may include shipment packages, cartons, containers, carts, totes, and/or the like. Applicant has identified a number of deficiencies and problems associated with conventional techniques used for maneuvering these articles in a material handling environment. Through applied effort, ingenuity, and innovation, many of these identified problems have been solved by developing solutions that are included in embodiments of the present disclosure, many examples of which are described in detail herein.

BRIEF SUMMARY

Various example embodiments of the present disclosure as described herein, relates generally to a gripping device having: a top plate, first side plate, a second side plate, a first arm, a second arm, and a driving pin. The top plate of the gripping device defines at least a first end and a second end. In this aspect, the first side plate is attached to the first end of the top plate and includes a first engaging element and the second side plate is attached to the second end of the top plate and includes a second engaging element. Further, the first arm of the gripping device is engaged with the first side plate and defines a first cam slot. The second arm of the gripping device is engaged with the second side plate and defines a second cam slot. According to said example embodiments, the driving pin of the gripping device defines a first portion configured to engage an actuation assembly and a second portion disposed within the first cam slot and the second cam slot. In accordance with said example embodiments, in response to an input from the actuation assembly, the driving pin is configured to move between a first position and a second position within the first cam slot and the second cam slot respectively, so as to drive movement of the first side plate and the second side plate between an open position and a closed position. In this aspect, the first engaging element and the second engaging element are configured to engage a container when the first side plate and the second side plate are in the closed position.

In an example embodiment, the first side plate and the second side plate of the gripping device are each hingedly connected with the first end of the top plate and the second end of the top plate respectively.

In another example embodiment, at least a portion of the first cam slot overlaps with at least a portion of the second cam slot.

In another example embodiment, the movement of the driving pin between the first position and the second position is configured to swing the first side plate and the second side plate inwardly towards each other so as to grip the container.

In another example embodiment, the movement of the driving pin between the first position and the second position is configured to swing the first side plate and the second side plate outwardly so as to release the container.

In an example embodiment, the driving pin is configured to engage the actuation assembly including at least a Geneva electric drive and a Geneva indexer wheel.

In another example embodiment, the first portion of the driving pin is configured to engage to a pin actuation unit of the actuation assembly.

In another example embodiment, the first position corresponds to a lower end of the first cam slot and an upper end of the second cam slot. Accordingly, the second position corresponds to an upper end of the first cam slot and a lower end of the second cam slot.

In some example embodiments, the gripping device includes a switching element coupled to at least two sensing elements to sense one of: an open state or a closed state of the first side plate and the second side plate of the gripping device.

According to another example embodiment, a device for gripping a container is described. The device includes: an electric indexing unit, a first side plate, a second side plat, a first arm, a second arm, and a driving pin. The electric index unit includes an indexer unit. The first side plate includes a first engagement element and the second side plate includes a second engagement element. The first arm is engaged with the first side plate and defines a first cam slot. The second arm is engaged with the second side plate and defines a second cam slot. In accordance with said example embodiment, the driving pin defines a first end engaged with the indexer unit of the electric indexing unit and a second end disposed within the first cam slot and the second cam slot. In this aspect, the electric indexing unit is configured to drive movement of the driving pin between a first position and a second position within at least a portion of the first cam slot and the second cam slot so as to drive movement of the first side plate and the second side plate between an open position and a closed position. In this regard, in the closed position, the first engaging element and the second engaging element are configured to engage a container.

In an example embodiment, the device includes a top plate that defines: a first end pivotally engaged with the first side plate and a second end pivotally engaged with the second side plate.

According to said example embodiments, the electric indexing unit includes a cam wheel and a motor electrically coupled to the cam wheel and configured to drive rotation of the cam wheel. The indexer unit further includes an indexer wheel and a pin actuation unit engaged with the indexer wheel.

In some example embodiments, the electric indexing unit comprises a Geneva electric drive and the indexer wheel comprises a Geneva indexer wheel.

According to some example embodiments, the first end of the driving pin is engaged with the pin actuation unit, and the pin actuation unit is configured to rotate with the indexer wheel based on the rotation of the cam wheel so as to drive movement of the driving pin between the first position and the second position.

In some example embodiments, the cam wheel includes, an indexing pin and an elevated circular disc having an orientation arc. In this aspect, the indexing pin of the cam wheel is configured to be received within an indexing slot of the indexer wheel based on the rotation of the cam wheel. In this regard, in an instance, in which the indexing pin is within the indexing slot of the indexer wheel, rotation of the cam wheel is configured to cause rotation of the indexer wheel along with the pin actuation unit so as to move the driving pin between the first position and the second position. In some example embodiments, the first position corresponds to a lower end of the first cam slot and an upper end of the second cam slot, and the second position corresponds to an upper end of the first cam slot and a lower end of the second cam slot.

In an example embodiment, the device is configured, via the top plate, to engage a robotic arm or a conveyor overhead so as to lift the container.

In some example embodiments, the device also includes a switching element coupled to at least two sensing elements and configured to sense an open state or a closed state of the first side plate and the second side plate of the device.

The above summary is provided merely for purposes of providing an overview of one or more exemplary embodiments described herein so as to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which are further explained in the following description and its accompanying drawings.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout. Terminology used in this patent is not meant to be limiting insofar as devices described herein, or portions thereof, may be attached or utilized in other orientations.

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

The terms "distribution center" and "material handling environments" refer to environments related to, but not limited to, manufacturing of items, inventory storage of items, packaging and unpackaging of items, preparing customer orders, recording items related information based on scanning and identification of the items, and shipment processing (including shipping and logistics distribution of the items). It may also be understood that material handling environments described herein may refer to an environment having various equipment, including, for instance, conveyor belt units, sorters, palletizers, and other scanning and identification based equipment's (including, but not limited to, barcode scanners, RFID readers, and bi-optic scanners) for tracking and tracing items as the items are processed while preparing customer orders for shipping.

The term "tote gripper" or "tote gripping device" is used for a machine that facilitates holding and gripping of articles like, but not limited to, totes, containers, packages, cartons, carts, and/or the like. The tote gripper or tote gripping devices may be installed in a material handling environment at various locations for instance, near a conveyor belt, at a conveyor overhead or on a palletizer, or on a robotic arm for performing operations such as holding and lifting the articles.

Devices such as tote grippers may be used for gripping totes or other containers, via robotic arms or overhead conveyors, and for relocating, repositioning, or otherwise maneuvering totes, within a distribution center. Existing tote gripper devices are often inefficient in operation and may, for example, fail to sufficiently grip to the tote resulting in potential slippages or dropping of the tote. Alternatively, some tote gripping devices apply excessive pressure on body of the tote resulting in damage to the body of the tote and/or its contents. Also, some lifting devices have limited lifting capacity and often experience gripping jams during a tote lifting operation.

Various example embodiments described herein relates to a device used for gripping totes or similar containers in a material handling environment. The device includes, two side plates pivotably fixed to a top plate, via an attachment assembly such as, a bearing unit or hinges. In some example embodiments, the device includes, a first side plate and a second side plate attached to the top plate of the device at two respective ends of the top plate. Further, the device includes a first arm engaged to the first side plate and a second arm engaged to the second side plate. In accordance with said example embodiments, the first arm defines a first cam slot and the second arm defines a second cam slot. The device also includes a driving pin defined by a first portion and a second portion. In this aspect, the first portion of the driving pin is engaged to an actuation assembly and the second portion of the driving pin is disposed within the first cam slot and the second cam slot defined at the first arm and the second arm respectively.

According to various example embodiments described herein, in response to an input from the actuation assembly, the driving pin is adapted to move between a first position and a second position within the first cam slot and the second cam slot, respectively. In this aspect, the driving pin moves between the first position and the second position, so as to, drive a movement of the first side plate and the second side plate between an open position and a closed position of side plates. In this regard, in the closed position of the side plates, a first engaging element and a second engaging element defined on respective side plates, engages with a container. In this regard, the engagement elements of the respective side plates are adapted to mate in a respective feature, for example a slot, on each side of the container, thereby locking the container between the two side plates. To this extent, the first engagement element and the second engagement element of the respective side plate defines a shape that complements a respective engagement feature on each respective side of the container, so that upon engagement, the engagement elements mate with the respective features of the container, thereby, locking the container between the side plates.

In accordance with some example embodiments, the two arms (i.e. the first arm and the second arm) engaged to each side plate (i.e. the first side plate and the second side plate) are offset with respect to one another such that, in a fully assembled version of the device, respective faces of the arms translate relative to one another, and a cam slot of one arm overlaps over a cam slot of the other arm. Further, in accordance with various example embodiments described herein, the cam slots (i.e. the first cam slot and the second cam slot) are constrained together by the driving pin of the device. In this aspect, the driving pin is engaged to one end of an indexer unit that includes a pin actuation unit to actuate movement of the driving pin whereas another end of the driving pin is disposed within an overlapping portion of the cam slots. The indexer unit, according to some example embodiments, may include a Geneva wheel drive and the driving pin which passes through respective cam slots of the arms such that movement of the Geneva wheel drive causes movement of the driving pin within the cam slots.

As described earlier, the driving pin is adapted to move between a first position and a second position within the cam slots. In this regard, as the driving pin translates within the overlapping portion of the cam slots, the arms follow the driving pin, which in turn swings the side plates inward and outward (e.g., between a closed and open position). For example, when the pin is at a first position within the cam slots, the side plates are positioned outwardly opposite to each other in an open position such that, a tote may be positioned between the side plates. Further, when the pin is actuated to a second position within the cam slots, the side plates move from the open position to a closed positioned (e.g., 90 degrees with respect to a top plate) so as to grip at tote therebetween.

In accordance with various embodiments described herein, the device includes an electric indexing unit including a cam wheel, the indexer wheel, and a pin actuation unit that is configured to facilitate sliding movement (e.g., translation) of the driving pin within the cam slots of the respective arms, thereby, causing the side plates to swing between the released (e.g., open) and locked (e.g., closed) positions of the device.

The device for gripping the containers, as described, in accordance with various example embodiments herein, facilitates in gripping the containers in a manner that prevents any slippage of the containers (e.g., a sufficiently firm grip) while lifting or transiting while also preventing damage to the body of the containers (e.g., avoiding excessive grip pressure). In this regard, an attachment assembly of the device may be configured to engage the side plates of the device with a top plate of the device such that the top plate bears the weight of a container held between the two side plates. In this way, the configuration prevents any transfer of excess force that would impact operations of other gripping components (e.g., arms, side plates, etc.) of the device that contacts the container. Furthermore, the indexing unit of the device includes slots on the indexer wheel so as to lock the pin at a desired position within the cam slots in order to prevent the side plates (e.g., grippers, engagement elements, etc.) from accidentally opening up and dropping the container. The engagement elements defined on the side plates of the device also locks the container between the side plates to further prevent slipping of the container from the gripping device. Also, the pin actuation unit and indexer wheel arrangement of the gripping device described in various example embodiments hereinafter, provides for repeatable and precise actuation of the side plates gripping the container in high cycle applications such as those performed by a robotic tool in a material handling environment.

Having described an example embodiment at a high level, the design of the various devices performing various example operations is provided below.

Figure 1:
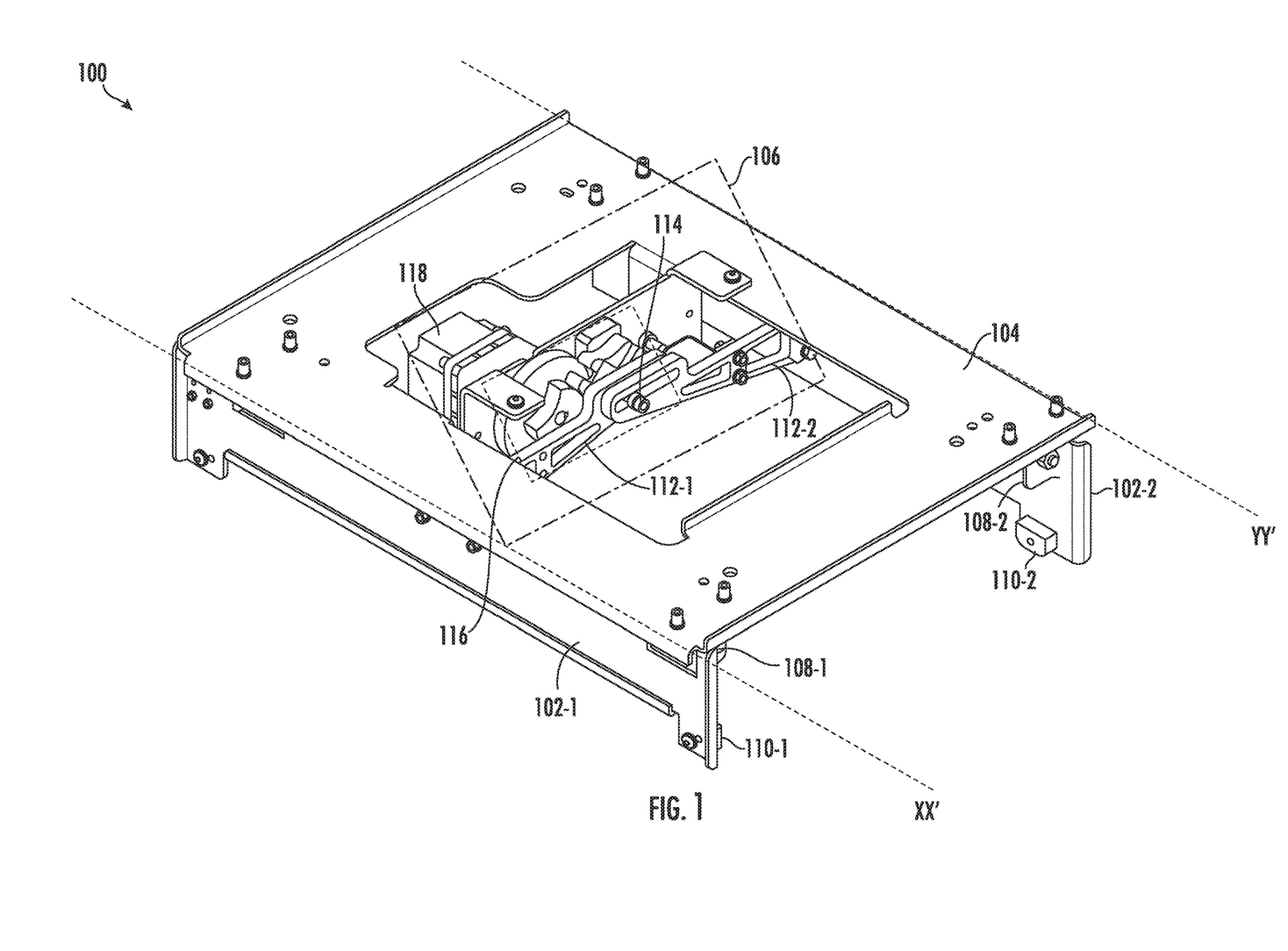
FIG. 1 illustrates a perspective view of a gripping device, in accordance with various example embodiments described herein.

FIG. 1 illustrates a perspective view of a gripping device in accordance with various example embodiments described herein. Illustratively, a gripping device 100 includes two side plates, a first side plate 102-1 and a second side plate 102-2, a top plate 104, and a side plate actuation assembly 106. The gripping device 100 is adapted to hold or grip articles (e.g., totes, containers, cartons, and/or the like), while the articles are lifted, transported, repositioned, or relocated within an environment by an actuation device (e.g., a robotic arm and/or a conveyor overhead unit). In this regard, the top plate 104 of the gripping device 100 may be mechanically engaged with one or more surfaces of the actuation device (not shown). In accordance with said example embodiments, the two side plates 102-1 and 102-2 of the gripping device 100 are pivotably engaged with the top plate 104. The side plates 102-1 and 102-2 are adapted to swing inwardly in a direction towards each other or outwardly in a direction opposite to each other, about the axes XX' and YY' respectively. In this aspect, each of the side plate 102-1 and 102-2 is engaged with a respective end of the top plate 104 by attachment assemblies 108-1 and 108-2, for example, a bearings or hinges and/or the like, that pivots the side plates 102-1 and 102-2 at the top plate 104, thereby allowing swinging of the side plates 102-1 and 102-2 about the axes XX' and YY' respectively. In this aspect, the side plates 102-1 and 102-2 are adapted to: (a) swing outwardly opposite to each other, to allow a container to be received between the two side plates 102-1 and 102-2 and (b) swing inwardly towards each other to hold the container received between the two side plates 102-1 and 102-2. Illustratively, each of the two side plates 102-1 and 102-2 includes engaging elements, i.e. a first engagement element 110-1 and a second engagement element 110-2 formed on or near an end of the side plates 102-1 and 102-2, respectively. The engagement elements 110-1 and 110-2 are adapted to engage with respective features of the containers received therein so as to lock the container between the two side plates 102-1 and 102-2.

In accordance with some example embodiments described herein, the side plate actuation assembly 106 is adapted to actuate swinging movement of the side plates 102-1 and 102-2 in an inward or an outward direction for holding or releasing the container. The side plate actuation assembly 106 includes two arms, i.e. a first arm 112-1 and a second arm 112-2, engaged with the two side plates 102-1 and 102-2 respectively. The side plate actuation assembly 106 also includes, a driving pin 114, an indexing unit 116, and an electric motor 118. As shown, the two arms, i.e. the first arm 112-1 and the second arm 112-2 are offset with respect to one another such that front faces of the two arms 112-1 and 112-2 translate relative to one another. The two arms 112-1 and 112-2 are constrained together by a driving pin 114. In some example embodiments, the side plate actuation assembly 106 defines an indexing mechanism in which the electric motor 118 controls the indexing unit 116 in order to drive movement of the driving pin 114 within the cam slots defined on the arms 112 so as to actuate swinging of the side plates 102-1 and 102-2. In this regard, as the driving pin 114 moves within the cam slots, the arms 112 follow the movement of the driving pin 114 in order to drive movement of the side plates 102-1 and 102-2. While two arms 112-1 and 112-2 are illustrated in FIG. 1, however, in accordance with various other examples any number of arms and side plates may be contemplated and used based on a desired application of gripping the container.

Figure 2A:
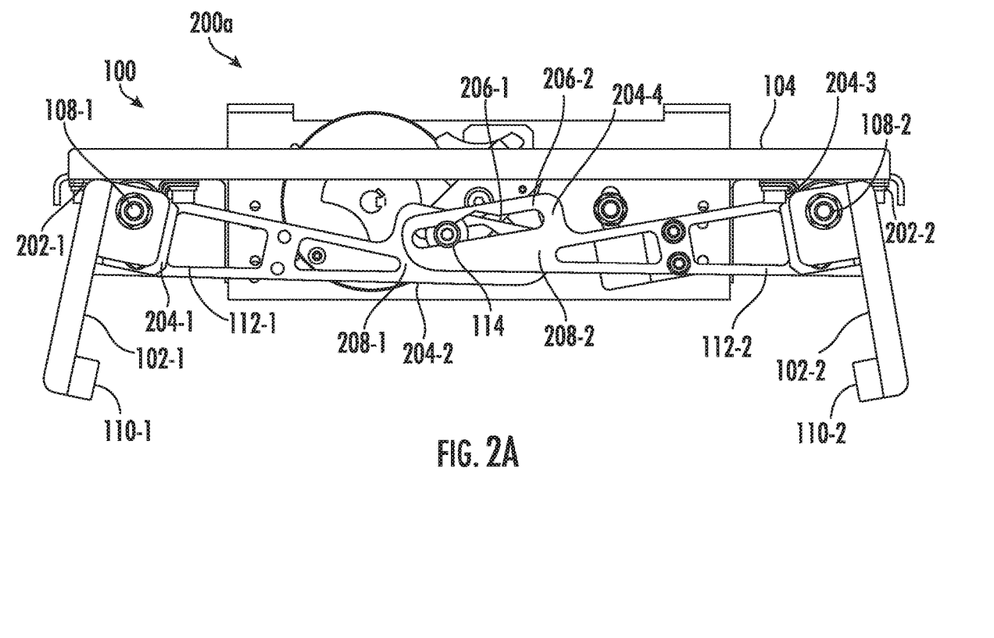
FIG. 2A illustrates a side view of the gripping device depicting a first state of two side plates of the gripping device, in accordance with some example embodiments described herein.

FIG. 2A illustrates a side view of the gripping device 100 depicting a first state 200a of the side plates 102-1 and 102-2 of the gripping device 100, in accordance with some example embodiments described herein. Illustratively, the two side plates 102-1 and 102-2 are engaged to the top plate 104 via the attachment assemblies 108-1 and 108-2 respectively. While described and illustrated with reference to the attachment assemblies 108-1 and 108-2, hinge connections of the attachment assemblies 108-1 and 108-2 may include any mechanism (e.g., a spring hinge, a barrel hinge, a pivot hinge, a bearing assembly, or the like) configured to pivotably engage the side plates 102-1 and 102-2 with the top plate 104. As shown, the first side plate 102-1 is engaged at a first end 202-1 of the top plate 104 and a second side plate 102-2 is engaged at a second end 202-2 of the top plate 104, via the attachment assemblies 108-1 and 108-2 respectively. Further details related to pivotal engagement of the side plates 102-1 and 102-2 with the top plate 104 are described with reference to FIGS. 5A and 5B.

Referring to FIG. 2A, as illustrated, the first arm 112-1 of the gripping device 100 is engaged to the first side plate 102-1 and the second arm 112-2 of the gripping device 100 is engaged to the second side plate 102-2. The engagement of two arms at respective side plates may be based on any mechanical engagement mechanism such as, a nut and bolt based arrangement and/or the like. In accordance with example embodiments, the first arm 112-1 at its first end 204-1 is engaged to the first side plate 102-1 and the second arm 112-2 at a third end 204-3 is engaged to the second side plate 102-2. Further, the first arm 112-1 at its second end 204-2 defines a first cam slot 206-1, and the second arm 112-2 at a fourth end 204-4 defines a second cam slot 206-2 respectively. Further, in an assembled version of the gripping device 100, the first arm 112-1 and 112-2 are offset with respect to each other so that front faces 208-1 and 208-2 of the two arms 112-1 and 112-2 translate relative to one another. As the front faces 208-1 and 208-2 of the two arms 112-1 and 112-2 translate, at least a portion of the first cam slot 206-1 overlaps with at least another portion of the second cam slot 206-2. Further, the first cam slot 206-1 and the second cam slot 206-2 are constrained together by the driving pin 114 which is adapted to move within an overlapped portion defined by the first cam slot 206-1 and the second cam slot 206-2.

Figure 2B:
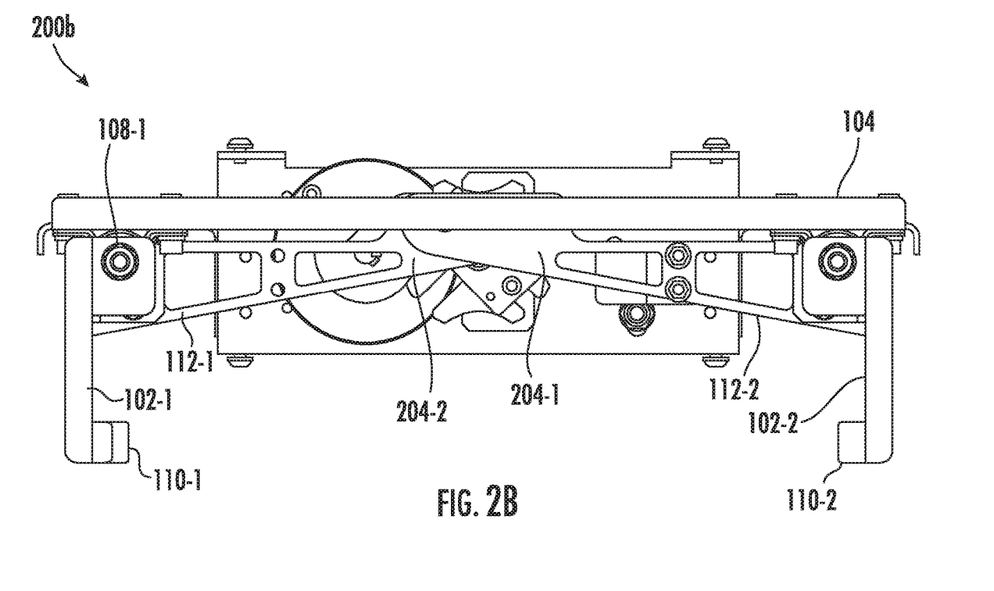
FIG. 2B illustrates another side view of the gripping device depicting a second state of two side plates of the gripping device, in accordance with some example embodiments described herein.

With continued reference to FIGS. 2A-2B, each of the first side plate 102-1 and the second side plate 102-2 includes a first engagement element 110-1 and a second engagement element 110-2, respectively. The first engagement element 110-1 and the second engagement element 110-2 may be shaped so as to complement similar features defined by the body of a container. Said differently, these complementary features may be configured such that the container may be locked between the side plates 102-1 and 102-2 based on mating of the first engagement element 110-1 and the second engagement element 110-2 with respective features on container's body. In accordance with various example embodiments described herein, the driving pin 114 may, in response to actuation, move within each of the first cam slot 206-1 and the second cam slot 206-2. In this regard, as the driving pin 114 moves within the first cam slot 206-1 and the second cam slot 206-2, the first arm 112-1 and the second arm 112-2 follow the movement of the driving pin 114. Thus, as the driving pin 114 shifts within the cam slots, the arms 112-1 and 112-2 move between a first position and a second position so as to cause the first side plate 102-1 and the second side plate 102-2 to swing between an open position (e.g., side plates 202 opposite each other) and a closed position (e.g., side plates towards each other). The actuation of the driving pin 114 is controlled by an indexing unit 116 details of which are described with reference to FIGS. 3A-3B and 4A-4D, respectively.

Referring to FIG. 2A, the gripping device 100 may be in a first orientation (e.g., a first state 200a, position, etc.) in which the side plates 102-1 and 102-2 are oriented outwardly opposite to one another forming an obtuse angle, with respect to the top plate 104 (e.g., such that the side plates 102-1 and 102-2 may not grip a container therebetween). The first state 200a, in accordance with various example embodiments described herein, may be interchangeably referred as a released or an open state, position, or the like of the gripping device 100. In the released or open state, the side plates 102-1 and 102-2 are oriented outwardly thereby widening a space between the side plates 102-1 and 102-2 to allow reception of the container between the side plates 102-1 and 102-2. Referring to FIG. 2B, the gripping device 100 may move to a second orientation or a second state 200b in which the side plates 102-1 and 102-2 are oriented towards each other such that the two side plates 102-1 and 102-2 are almost perpendicular to the top plate 104. The second state 200*b* may be interchangeably referred to as a locked or a closed state, position, or the like of the gripping device 100. In the locked or closed state, the side plates 102-1 and 102-2 are oriented inwardly towards each other thereby closing the widened space between the two side plates 102-1 and 102-2 so as to grip the container received therebetween and prevent slippage of the container. In accordance with various example embodiments described herein, the engagement elements 110-1 and 110-2 of the first side plate 102-1 and the second side 102-2, respectively, may engage with respective features on the container's body. In this regard, the state, position, or configuration of the gripping device 100 may transition between the first state 200*a* and the second state 200*b* based on movement of the driving pin 114 actuated by the indexing unit of the gripping device 100, details of which are described with reference to FIGS. 3A-3B and 4A-4D.

Figure 3A:
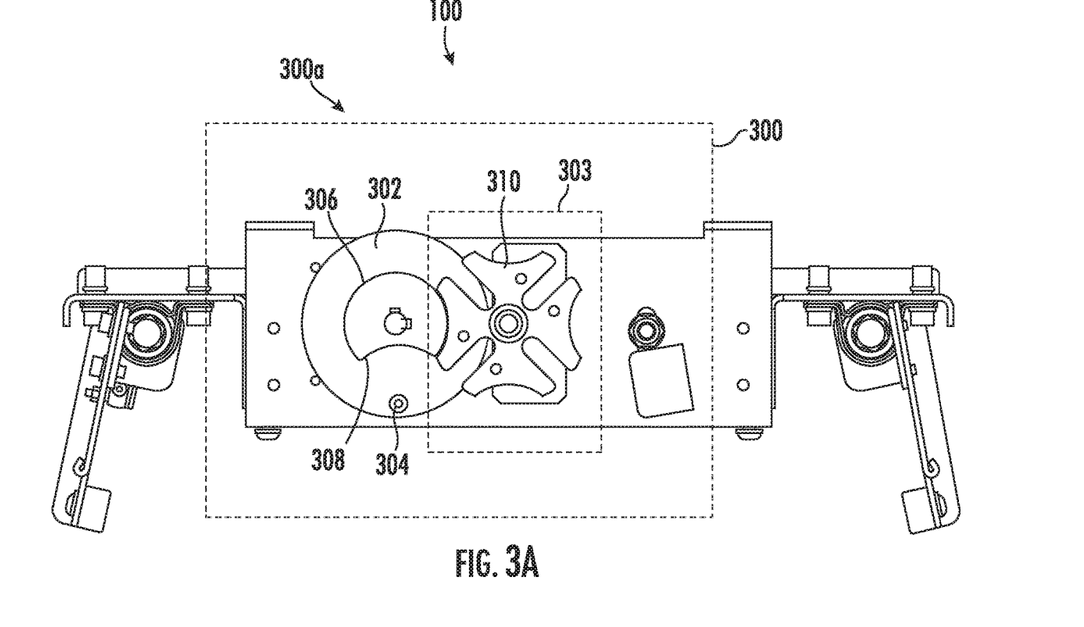
FIGS. 3A and 3B illustrate side views of an electric indexing unit of the gripping device, in accordance with some example embodiments described herein.
Figure 3B:
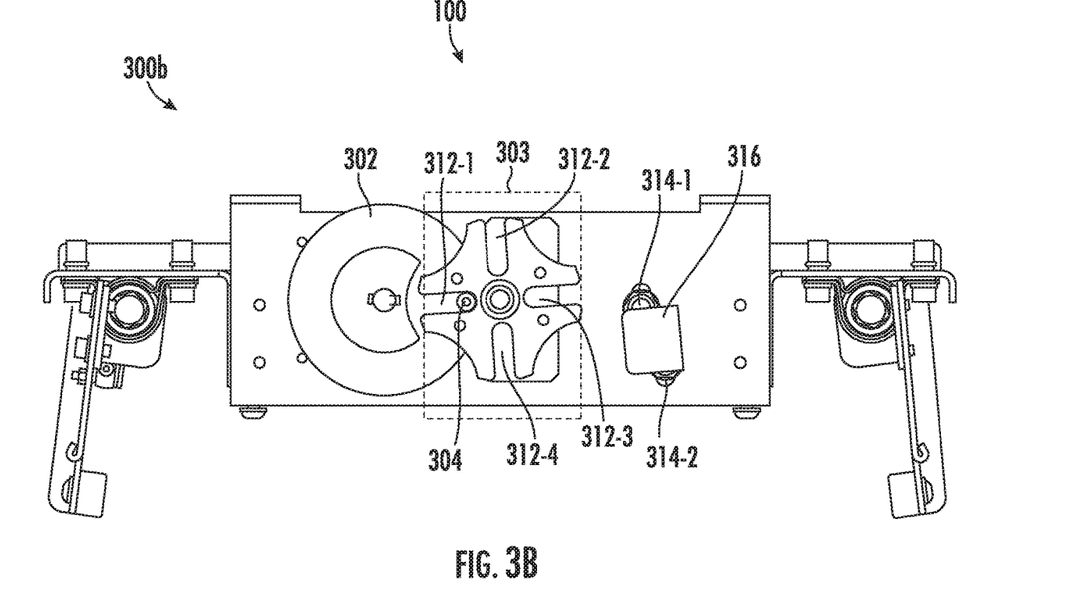

FIGS. 3A and 3B illustrate side views of an electric indexing unit 300 of the gripping device 100 in accordance with some example embodiments described herein. In accordance with some example embodiments, the electric indexing unit 300 of the gripping device 100 includes, an electric motor (not shown), a cam wheel 302, and an indexer unit 303. The electric indexing unit 300 is configured to drive actuation of a pin constraining the arms of the gripping device, for instance, the driving pin 114 so as to move the driving pin 114 to various positions within the first and second cam slots 206-1, 206-2. In accordance with said example embodiments, to prevent accidental or undesired opening of the side plates 102-1 and 102-2, the driving pin 114 moves to either a first position or to a second position within an overlapping portion of the cam slots, 206-1 and 206-2. Said differently, as the driving pin 114 moves to the first position or the second position within the cam slots 206-1 and 206-2, a further movement of the driving pin 114 is prevented by the indexer unit 303 of the electric indexing unit 300.

According to some embodiments, the electric indexing unit 300 is a Geneva electric drive including a Geneva indexer wheel coupled to an electric motor and the cam wheel 302. Further, the Geneva electric drive is mechanically coupled to a pin actuation unit (not shown). As illustrated, the cam wheel 302 includes an indexing pin 304 and a circular disc 306 having an orientation arc 308. The circular disc 306 is defined as an elevation from a surface of the cam wheel 302. In some embodiments, the indexer unit 303 includes a pin actuation unit (not shown) and an indexer wheel 310. The indexer wheel 310 may include a first indexing slot 312-1, a second indexing slot 312-2, a third indexing slot 312-3, and a fourth indexing slot 312-4. In accordance with said example embodiments described herein, these indexing slots may be separated along the indexer wheel 310 at 90 degree intervals (e.g., at 0/360 degrees, 90 degrees, 180 degrees, and 270 degrees).

In another example embodiment, the electric indexing unit 300 may include an air cylinder based indexing mechanism adapted to actuate the pin actuation unit driving a movement of the driving pin 114 within the cam slots 206-1 and 206-2 of the gripping device 100.

Rotation of the Cam Wheel and the Indexer Wheel

In accordance with various example embodiments described herein, the cam wheel 302 and the indexer wheel 310 are configured to rotate about their respective central axes in either a clockwise or counterclockwise direction. The electric motor (not shown) of the electric indexing unit 300 drives the rotation of the cam wheel 302. As the cam wheel 302 rotates, the indexing pin 304 and the circular disc 306 follows the rotation of the cam wheel 302. Further, as the cam wheel 302 rotates, the indexing pin 304 may be received in any of the indexing slots (i.e., the first indexing slot 312-1, the second indexing slot 312-2, the third indexing slot 312-3, and the fourth indexing slot 312-4) of the indexer wheel 310 so as to drive a rotation of the indexer wheel 310. In accordance with various example embodiments described herein, the electric indexing unit 300 operates in a manner such that a 360-degree rotation of the cam wheel 302 causes a 90-degree rotation of the indexer wheel 310. Said differently, a 90-degrees rotation of the indexer wheel actuates the pin actuation unit (not shown) to move the driving pin 114 from one position to another position within the cam slots, 206-1 and 206-2.

According to some example embodiments described herein, a half cycle rotation of the cam wheel 302 in a clockwise direction may actuate the pin actuation unit to move the driving pin 114 within the cam slots 206-1 and 206-2 from a first position to a second position. Further, another half cycle rotation of the cam wheel 302 in a counterclockwise direction may actuate the pin actuation unit to move the driving pin 114 from the second position to the first position within the cam slots 206-1 and 206-2. In this regard, the electric motor of the electric indexing unit 300 may drive the cam wheel 302 to rotate half cycles of the clockwise rotation and the counterclockwise rotation in an alternating fashion, to move the driving pin 114 back and forth between the first position and the second position within the cam slots 206-1 and 206-2.

Referring to FIG. 3A, the indexing pin 304 is illustrated prior to receipt by an indexing slot of the indexer wheel 310. As the cam wheel 302 rotates counter clockwise, however, the indexing pin 304 moves into the first indexing slot 312-1 of the indexer wheel 310, as shown in FIG. 3B. Further counter clockwise movement of the cam wheel 302 and the indexing pin 304, which is fixed to the cam wheel 302, within the first indexing slot 312-1 drives rotation of the indexer wheel 310 in a clockwise direction. For instance, FIG. 3A illustrates a starting position of the indexing pin 304 and FIG. 3B illustrates the position of the indexing pin 304 in a middle of a rotation cycle, when the cam wheel 302 rotates counter clockwise and the indexer wheel 310 rotates clockwise. In this regard, the pin actuation unit (not shown) is engaged with the indexer wheel 310, and as the indexer wheel 310 rotates, the pin actuation unit (not shown) follows the rotation of the indexer wheel 310 so as to actuate movement of the driving pin 114. Details related to the pin actuation unit are described with reference to FIGS. 4A-4D.

Figure 6A:
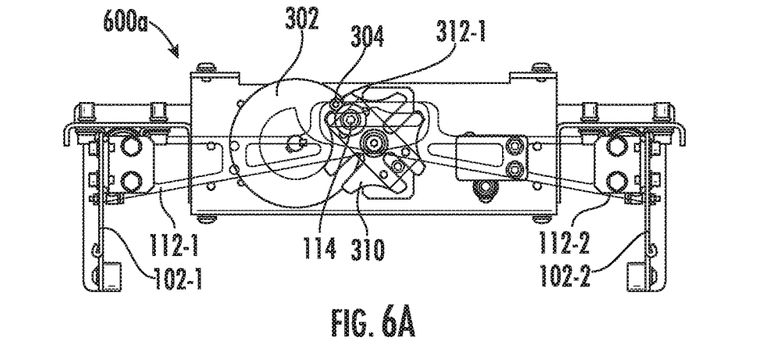
FIGS. 6A-6D illustrate actuation of a pin actuation unit by an electric indexing unit of a gripping device, in accordance with various example embodiments described herein.

A further rotation of the cam wheel 302 moves the indexing pin 304 out from the first indexing slot 312-1, details of which are shown in FIG. 6A, and the indexer wheel 310 halts rotation. The electric motor of the electric indexing unit 300 may stop the clockwise rotation of the cam wheel 302, as the cam wheel 302 completes a half cycle of rotation of the cam wheel 302 and as the indexing pin 304 moves out from an indexing slot (e.g., the first indexing slot 312-1). At this instance, in accordance with various example embodiments described herein, the driving pin 114 has moved from one position to another position within the cam slots 206-1 and 206-2 of the gripping device 100, details of which are described further with reference to FIGS. 4A-4D.

In some example embodiments, the cam wheel 302 may be further rotated 270-degrees in counter clockwise direction until the indexing pin 304 moves into the second indexing slot 312-2 of the indexer wheel 310 for a next clockwise rotation of the indexer wheel 310. In accordance with said example embodiments, however, the counter clockwise rotation of the cam wheel 302 may be stopped by the electric motor as the cam wheel 302 completes a half cycle rotation and the cam wheel 302 is rotated in a clockwise direction for the next half cycle of rotation such that the indexing pin 304 moves into the first indexing slot 312-1 and drives the indexer wheel 310 in a counter clockwise direction. In this regard, as the indexer wheel 310 rotates counter clockwise, the pin actuation unit (not shown) is actuated to move the pin 214 from the second position to the first position within the cam slots 206-1 and 206-2 of the gripping device 100. This alternating movement including half cycle rotations of the cam wheel 302 in clockwise and counterclockwise directions may be driven by the electric motor of the electric indexing unit 300.

In accordance with various example embodiments described herein, the electric motor may receive an input instructing an operation of the electric motor to drive the indexer wheel 310. This input may be a sensory input indicating a desired state or position (e.g., the first state 200*a* or the second state 200*b*) of the side plates 102-1 and 102-2. In this regard, the gripping device 100, described in accordance with various example embodiments herein may include at least sensing elements 314-1 and 314-2 and a switching element 316 mechanically coupled to the sensing elements 314-1 and 314-2. In some example embodiments, the sensing elements 314-1 and 314-2 are proximity sensors adapted to detect proximity with one or more elements on the gripping device 100 and provide sensor data to a controller unit (not shown) controlling operation of the electric motor. For instance, in some example embodiments, the sensing elements 314-1 or 314-2, upon actuation, are configured to sense a proximity between the side plates 102-1 and 102-2 of the gripping device 100 and/or the driving pin 114 and to identify the state (e.g., first open state 100*a* or second closed state 100*b*) of the gripping device 100 to the electric motor. Based upon this identification of the state of the gripping device 100 by the sensing elements 314-1 and 314-2, the electric motor may drive a half cycle clockwise or counterclockwise rotation of the cam wheel 302 which further drives a counterclockwise or clockwise rotation, respectively, of the indexer wheel 310.

In some example embodiments, the switching element 316 may be a metal flap that is mechanically engaged to an arm such as the second arm 112-2 of the gripping device 100. In this regard, following a movement of the second arm 112-2, the switching element 316 is configured to move up and down between two positions. In this aspect, as the cam wheel 302 completes a half cycle rotation counter clockwise, the switching element 316 may move up to a first position, such that the switching element blocks the sensing element 314-1 and clears the sensing element 314-2. Alternatively, as the cam wheel 302 completes a half cycle counterclockwise rotation, the switching element 316 may move down to a second position such that the switching element blocks the sensing element 314-2 and clears the sensing element 314-1. For instance, referring to FIG. 3A, in an instance in which the two side plates of the gripping device 100 are positioned outwardly opposite to one another (e.g., an open position), the switching element is located in the second position blocking the sensing element 314-2. This blocking and actuation of the sensing elements 314-1 or 314-2 may cause the electric motor of the electric indexing unit 300 to drive a next rotation cycle (e.g., a half cycle clockwise rotation or half cycle counterclockwise rotation of the cam wheel 302) thereby driving the rotation of the indexer wheel 310 in either a counterclockwise direction or clockwise direction to actuate the pin actuation unit, details of which are further described with reference to FIGS. 4A-4D.

FIG. 4A-4D illustrates perspective views 400*a*, 400*b*, 400*c*, and 400*d* of a gripping assembly 401 of the gripping device 100, in accordance with some example embodiments described herein. The gripping assembly 401, in accordance with various example embodiments described herein, is adapted to drive swinging of side plates of the gripping device 100, inwardly towards each other or outwardly opposite to each other, to hold or release a container, for example, a tote.

Figure 4A:
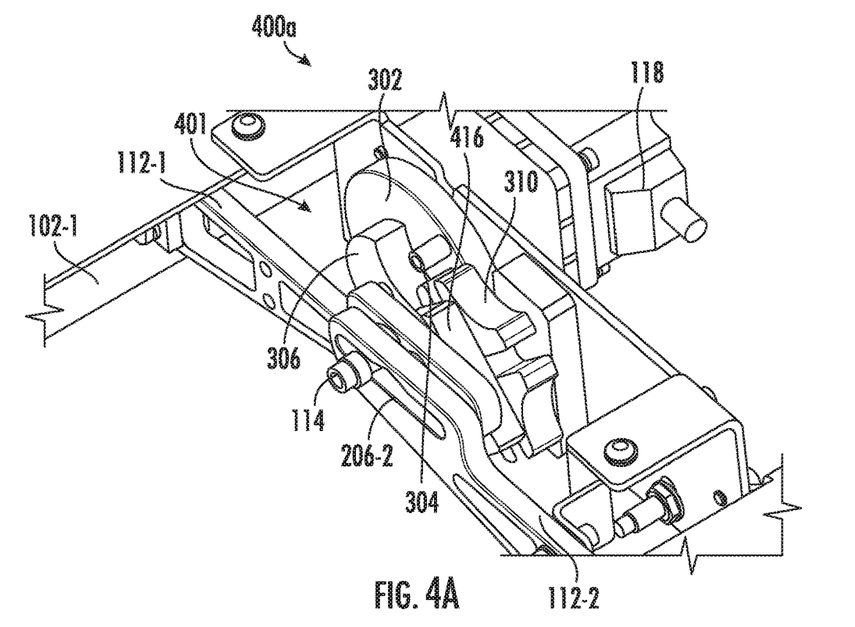
FIGS. 4A-4D illustrate perspective views of a gripping assembly of the gripping device, in accordance with some example embodiments described herein.
Figure 4B:
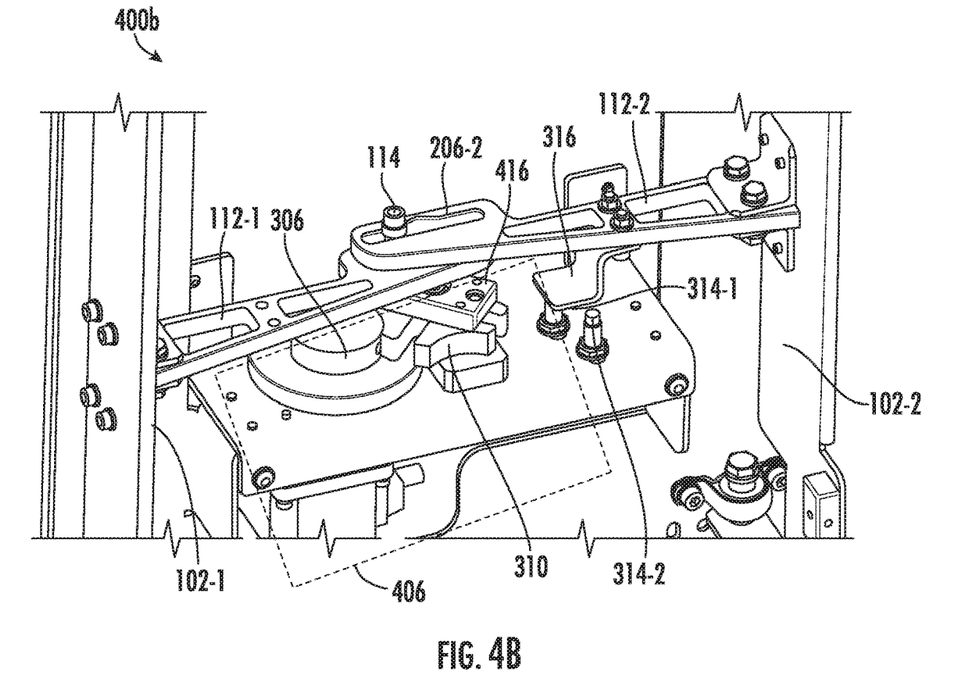
Figure 4C:
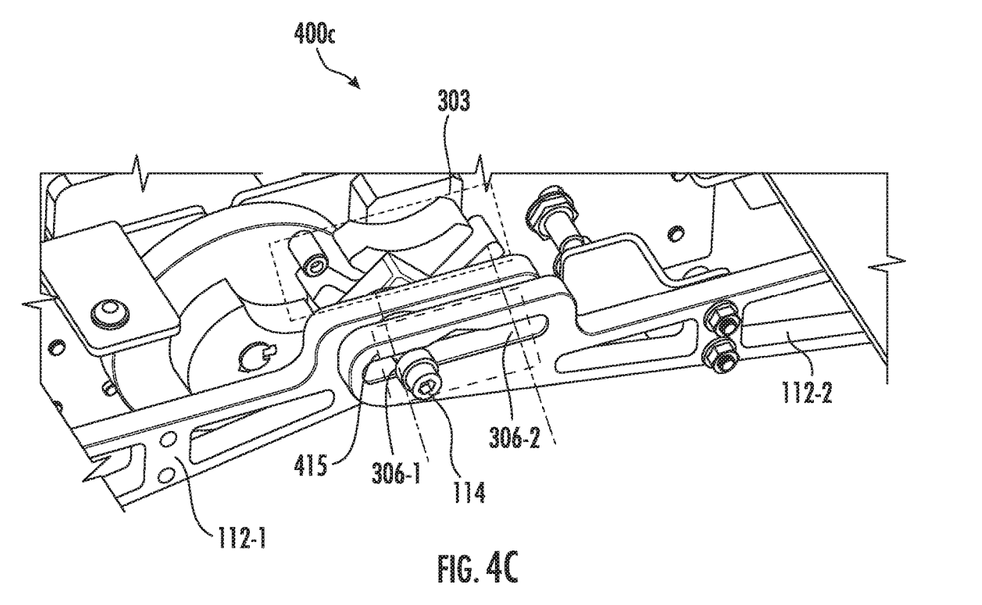

FIGS. 4A-4C illustrate the first arm 112-1 and the second arm 112-2 of the gripping device 100 engaged to the first side plate 102-1 and the second side plate 102-2 of the gripping device 100, respectively. Further, the gripping assembly 401 includes, the electric indexing unit 300 and the first arm 112-1 and the second arm 112-2 constrained together by the driving pin 114. The electric indexing unit 300, in accordance with example embodiments described herein, is adapted to actuate a pin actuation unit 416, illustrated in FIGS. 4A and 4B, that drives movement of the driving pin 114 within at least a portion of the first cam slot 206-1 and a portion of the second cam slot 206-2 defined on the first arm 112-1 and the second arm 112-2, respectively.

In accordance with example embodiments described herein, the electric indexing unit 300 of the gripping device 100 includes, the electric motor 118, the cam wheel 302, and the indexer unit 303. The electric motor 118 may correspond to, but not limited to, a Direct Current (DC) motor, a rotary pneumatic actuator, a rotary hydraulic actuator, and/or the like. In some embodiments, the electric motor 118 is a brushless DC motor with an inline gearbox that is mechanically engaged with the cam wheel 302. Further, the electric motor 118, in accordance with said example embodiments, is configured to drive rotation of the cam wheel 302 in a clockwise or counterclockwise fashion, similar to the rotation of the cam wheel 302, as described in reference to FIGS. 3A and 3B. Illustratively, the cam wheel 302 includes the circular disc 306, similar to the circular disc 306 illustrated in FIGS. 3A and 3B, and the indexing pin 304, similar to the indexing pin 304 illustrated in FIGS. 3A and 3B.

As shown, the indexer unit 303 includes the pin actuation unit 416 and the indexer wheel 310. The pin actuation unit 416, according to said example embodiments, is mechanically engaged with the indexer wheel 310 such that the pin actuation unit 416 follows a rotation of the indexer wheel 310 driven by the electric motor 118 via the cam wheel 302, thereby actuating movement of the driving pin 114 within the first cam slot 206-1 and the second cam slot 206-2.

Figure 4D:
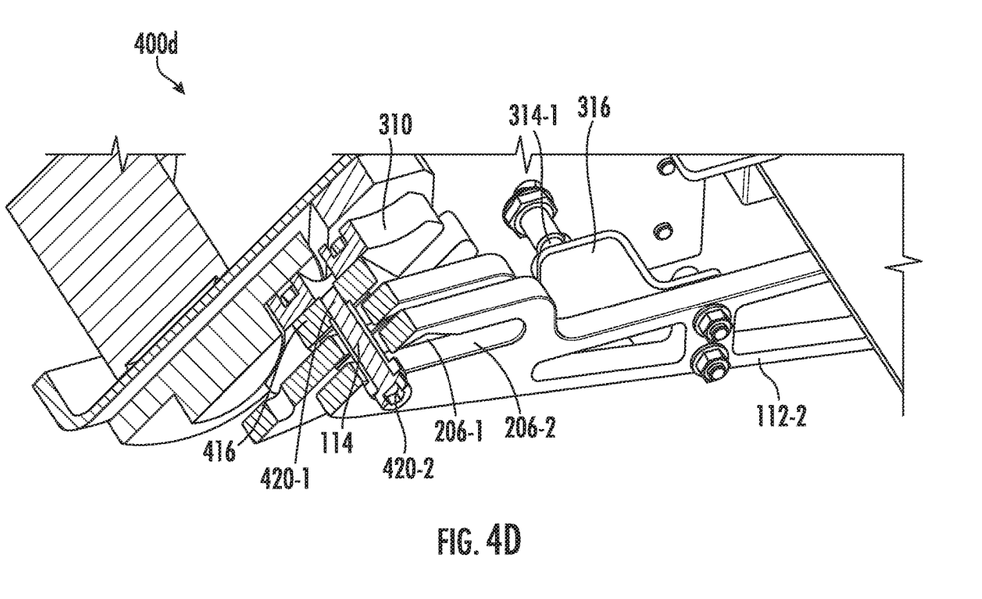

FIG. 4D illustrates a cut away perspective view of the gripping assembly 401. Illustratively, the driving pin 114 defines a first end 420-1 and a second end 420-2 such that, the driving pin 114 at its first end 420-1 is engaged to the pin actuation unit 416 and through passes at least a portion of the first cam slot 206-1 and at least a portion of the second cam slot 206-2. The second end 420-2 of the driving pin 114 is adapted to move to various positions within at least a portion 415 defined by overlapping portions of the first cam slot 206-1 and the second cam slot 206-2. For example, referring to FIG. 4C, in some embodiments, the driving pin 114 is adapted to move, at least within an overlapped portion defined by the first cam slot 206-1 and the second cam slot 206-2, respectively, from a first position 306-1 to a second position 306-2 and vice versa.

In accordance with some example embodiments described herein, to prevent an accidental opening or closing of the side plates 102-1 and 102-2 during an operation, after the driving pin 114 moves to either the first position 306-1 or the second position 306-2, the elevated, round boss feature, i.e. the orientation arc 308 of the cam wheel 302 becomes perfectly seated in a cutout arc defined on the indexer wheel 310, blocking indexer wheel 310 from rotating in either direction. Since the driving pin 114 is fixed to the pin actuation unit 416, which is engaged to the indexer wheel 310, the arms 112-1 and 112-2 are locked in this position as well.

In this aspect, upon actuation of the pin actuation unit 416, as the driving pin 114 slides within first cam slot 206-1 and the second cam slot 206-2, the first arm 112-1 and the second arm 112-2 follow the movement of the driving pin 114 due to the low frictional force generated between an outer surface of the driving pin 114 and internal lateral surfaces defining the cam slots 206-1 and 206-2, respectively. In some example embodiments, the driving pin 114 may move within the portion 415 defined by an overlapping portion of the first cam slot 206-1 and the second cam slot 206-1 farther to the first position 306-1 towards the first side plate 102-1 and the farther to the second position 306-2 towards the second side plate 102-1, respectively. In some example embodiments, the first position 306-1 may correspond to a lower end of the first cam slot 206-1 and an upper end of the second cam slot 206-2. Accordingly, the second position 306-2 may correspond to an upper end of the first cam slot 206-1 and a lower end of the second cam slot 206-2. FIG. 4D also illustrates the sensing element 314-1 and the switching element 316 mechanically engaged with the second arm 112-2 of the gripping device 100, operations of which are described in reference to FIGS. 3A and 3B.

Figure 5A:
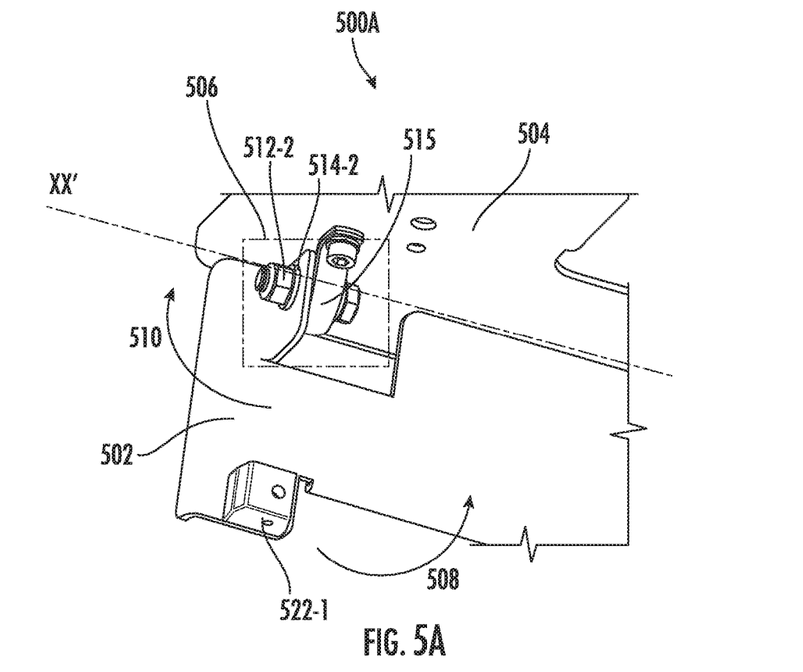
FIG. 5A illustrates a perspective view of a pivotal engagement of a side plate of a gripping device, in accordance with some example embodiments described herein.

As described with reference to FIG. 2, the side plates 102-1 and 102-2 of the gripping device 100 are pivotally engaged to the top plate 104 of the gripping device 100 via the attachment assemblies 108-1 and 108-2. FIG. 5A illustrates a perspective view 500A of an example pivotal engagement of a side plate 502 of the gripping device 100 by an example attachment assembly 506. In this aspect, while the attachment assembly 506 engages the side plate 502 with the top plate 504, it also allows the side plate 502 to swing inwardly in a direction 508 or outwardly in a direction 510, about an axis XX', for example, when subjected to an inward pull or outward push by side arms engaged with the respective side plate 502. As illustrated, the attachment assembly 506 includes a nut and bolt arrangement 512 supported with two washer elements 513-1 and 513-2, and a block bearing 514-1 and a spacer element 514-2. The nut and bolt arrangement 512 includes a bolt 512-1 that defines a first end 511-1 and a second end 511-2. The bolt 512-1 passes from the first end 511-1 through a hinge element 515 and a feature 516 defined on the side plate 502 and is engaged in the nut 512-2 at the second end 511-2. Further, the engagement of the bolt 512-1 within the nut 512-2 is supported with two washer elements 513-1 and 513-2, respectively, at the first end 511-1 and the second end 511-2. The bolt 512-1 is also supported by the block bearing 514-1 along with the spacer element 514-2 that supports a rotation of the bolt 512-1 about the axis XX'.

In accordance with various example embodiments described herein, the attachment assembly 506 provides a pivotal engagement of the side plate 502 with the top plate 504 about the axis XX' such that, the side plate 502 can swing based on rotation about the nut and bolt arrangement 512 supported with the washer elements 513-1 and 513-2 and the block bearing 514-1 along with the spacer element 514-2. Illustratively, the hinge element 515 is engaged at one end 516-1 to the top plate 504 of the gripping device 100 and at other end 516-2 to the side plate 502. In this regard, the hinge element 515 is configured to bear a weight of a tote that is to be engaged between the side plates of the gripping device 100.

Figure 5B:
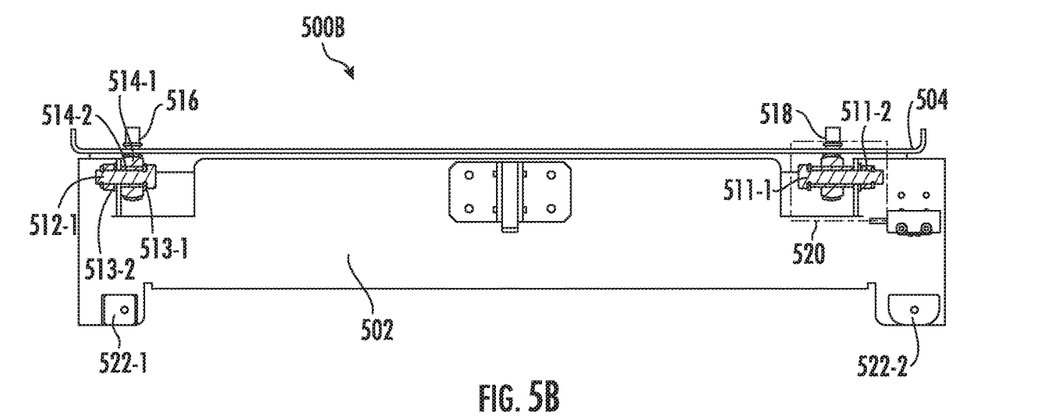
FIG. 5B illustrates a cut away perspective view of the side plate engaged to a top plate, in accordance with some example embodiments described herein.

FIG. 5B depicts a cut away perspective view 500B of the nut and bolt arrangement 512 including the bolt 512-1 fastened into the nut 512-2. In an example embodiment, the side plate 502 may be pivotably engaged to the top plate 504 via two attachment assemblies, similar to the attachment assembly 506, at a first end 518-1 and a second end 518-2 of the top plate 504. In this regard, a second attachment assembly 520, similar to the attachment assembly 506, engages the side plate 502 with the top plate 504 at its second end 518. As illustrated, the side plate 502 also include, a first engagement element 522-1 and a second engagement element 522-2 adapted to engage with respective features defined on a container such as, the tote to be held between the side plates of the gripping device 100. In accordance with some example embodiments described herein, a shape of the first engagement element 522-1 and the second engagement element 522-2 may complement a shape of the respective feature of a container or the tote so as to mate with the respective feature on the container to be gripped by the gripping device 100.

Figure 6B:
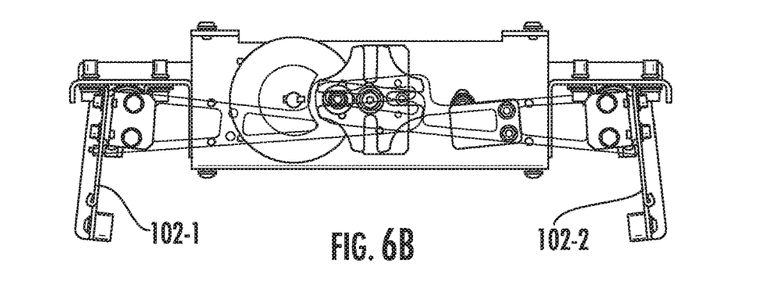
Figure 6C:
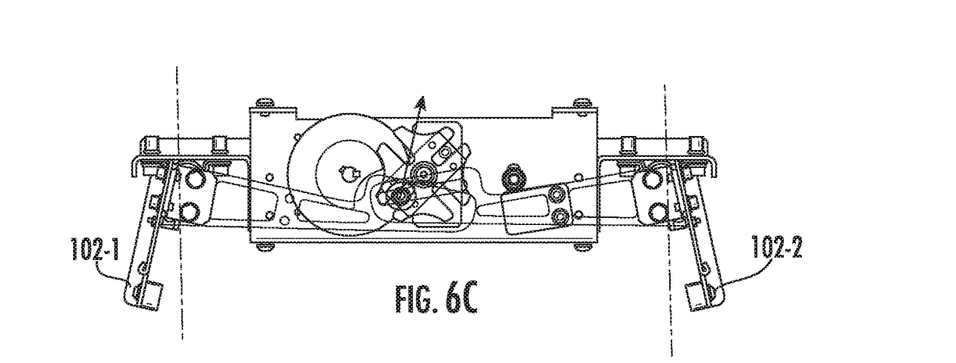

FIGS. 6A-6D illustrate operations of the electric indexing unit 300 actuating the pin actuation unit 416 for opening and closing the side plates of the gripping device 100, in accordance with various example embodiments described herein. Referring to FIG. 6A, a state 600a of the gripping device 100 is illustrated that depicts side plates, i.e. the first side plate 102-1 and the second side plate 102-2 of the gripping device 100 in a closed position. In the closed position, the side plates 102-1 and 102-2 are positioned almost perpendicular with respect to the top plate 104. Also, in the closed position, the driving pin 114 (constraining cams slots of the two arms 112-1 and 112-2 that are engaged to the side plates 102-1 and 102-2 respectively) is at a first position. In accordance with some example embodiments, as the cam wheel 302 of the electric indexing unit 300 is rotated clockwise by the electric motor 118 of the electric indexing unit 300, the indexing pin 304 follows the rotation of the cam wheel 302. Upon continued rotation of the cam wheel 302, the indexing pin 304 is received in an indexing slot, for example, the first indexing slot 312-1 of the indexer wheel 310. A further clockwise rotation of the cam wheel 302 causes the indexing pin 304 to move further within the first indexing slot 312-1, thereby, initiating a counterclockwise rotation of the indexer wheel 310 as already described in reference with FIGS. 3A and 3B. In this regard, as the indexer wheel 310 starts an anticlockwise rotation, the driving pin 114 starts moving away from the first position within a portion of the cam slots 206-1 and 206-2 defined on the two arms 112-1 and 112-2 of the gripping device 100. Thus, the driving pin 114 slides within the portion defined by an overlapping of the cam slots 206-1 and 206-2, thereby causing a swing of the side plates 102-1 and 102-1 in an outward direction opposite to each other which leads to opening of the side plates 102-1 and 102-2. For instance, FIGS. 6B and 6C illustrate opening of the side plates 102-1 and 102-2, due to further rotation of the indexer wheel 310 in a counter clockwise direction.

In accordance with said example embodiments, a movement of the driving pin 114 continues from the first position towards a second position within the cam slots 206-1 and 206-2, unless at least one of, (a) the indexer wheel 310 stops a rotation in the counterclockwise direction or (b) the driving pin 114 reaches a second position and may not move further within the cam slots 206-1 and 206-2. For instance, referring to FIG. 6D, as the indexing pin 304 moves out from the first indexing slot 312-1, the indexer wheel 310 eventually, stops the counterclockwise rotation and the driving pin 114 reaches the second position within the cam slots 206-1 and 206-2. At this instance, referring to state 600d of the gripping device 100, the side plates 102-1 and 102-2 of the gripping device 100 are opened such that, the side plates 102-1 and 102-2 are not perpendicular to the top plate 104. In accordance with various example embodiments described herein, at this open position of the side plates 102-1 and 102-2 illustrated in FIG. 6D, a tote or a similar container may be positioned between the side plates 102-1 and 102-2 so as to be gripped by the device 100.

Figure 6D:
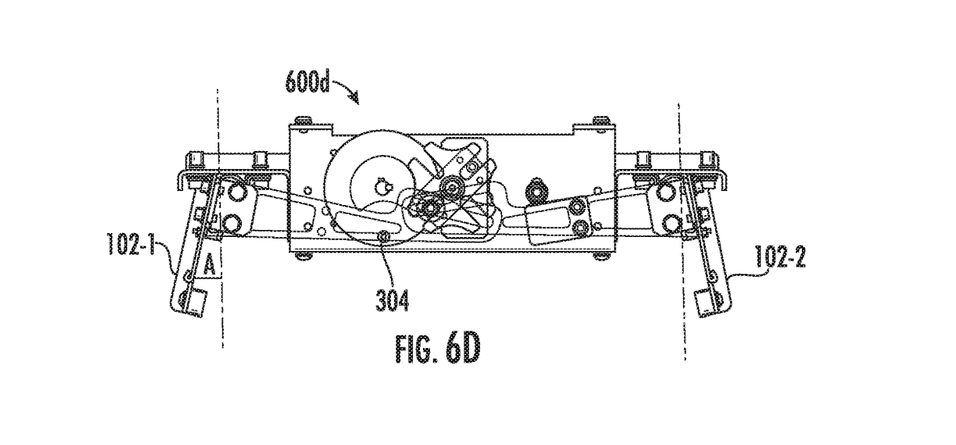

In accordance with various example embodiments described herein, a clockwise rotation of the cam wheel 302 may be stopped once the device 100 reaches a state, for instance the state illustrated in FIG. 6D, where the side plates 102-1 and 102-2 are opened and the indexing pin 304 is moved out from the first indexing slot 312-1. The cam wheel 302 may thereafter be further rotated in a counterclockwise direction by the electric motor 118 of the electric indexing unit 300, which causes the indexing pin 304 to move along with the cam wheel 302. Upon continued rotation of the cam wheel 302, the indexing pin 304 is received back in the first indexing slot 312-1 of the indexer wheel 310. A further counterclockwise rotation of the cam wheel 302 causes the indexing pin 304 to move further within the first indexing slot 312-1, thereby, initiating a clockwise rotation of the indexer wheel 310 as already described in reference with FIGS. 3A and 3B. In this regard, as the indexer wheel 310 starts the clockwise rotation, the driving pin 114 starts moving away from the second position within a portion of the cam slots 206-1 and 206-2 defined on the two arms 112-1 and 112-2 of the device 100. Thus, the driving pin 114 slidably moves within the portion defined by an overlapping of the cam slots 206-1 and 206-2, thereby causing a swing of the side plates 102-1 and 102-1 in an inward direction opposite to each other which leads to closing of the side plates 102-1 and 102-2. In accordance with said example embodiments, a movement of the pin driving 114 continues from the second position towards the first position within the cam slots 206-1 and 206-2, unless at least one of, (a) the indexer wheel 310 stops a rotation in the clockwise direction or (b) the driving pin 114 reaches back to the first position and may no more move further within the cam slots 206-1 and 206-2, as illustrated in FIG. 6A. At this instance, one or more engaging elements 110-1 and 110-2 of the side plates 102-1 and 102-2 respective engages with respective features on the tote, thereby providing gripping of the tote between the two side plates.

Figure 7A:
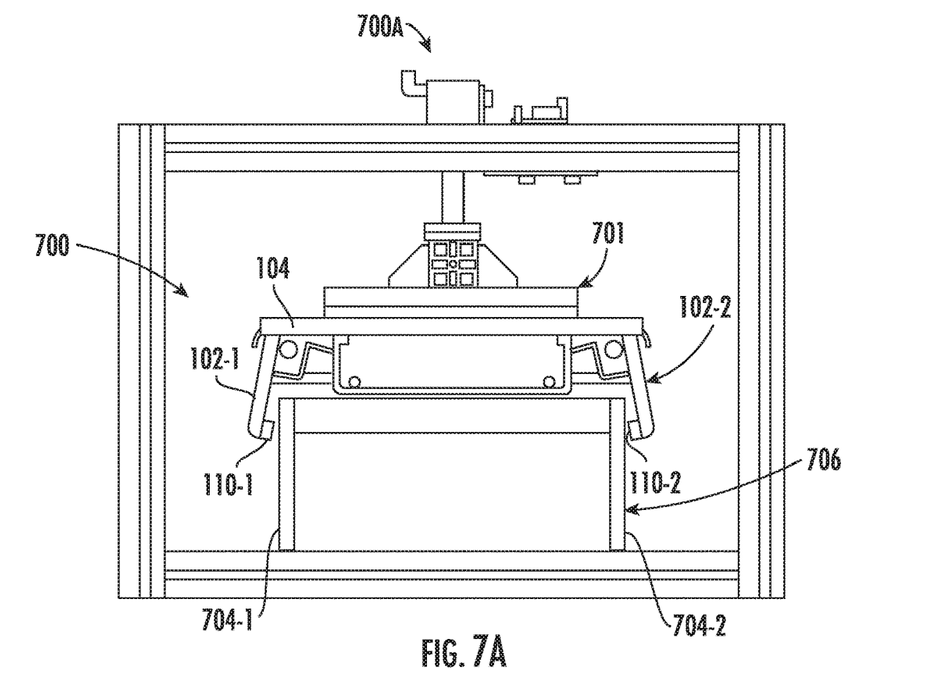
FIGS. 7A and 7B illustrate a tote gripping device and operations of the tote gripping device for gripping a tote, in accordance with some example embodiments described herein.
Figure 7B:
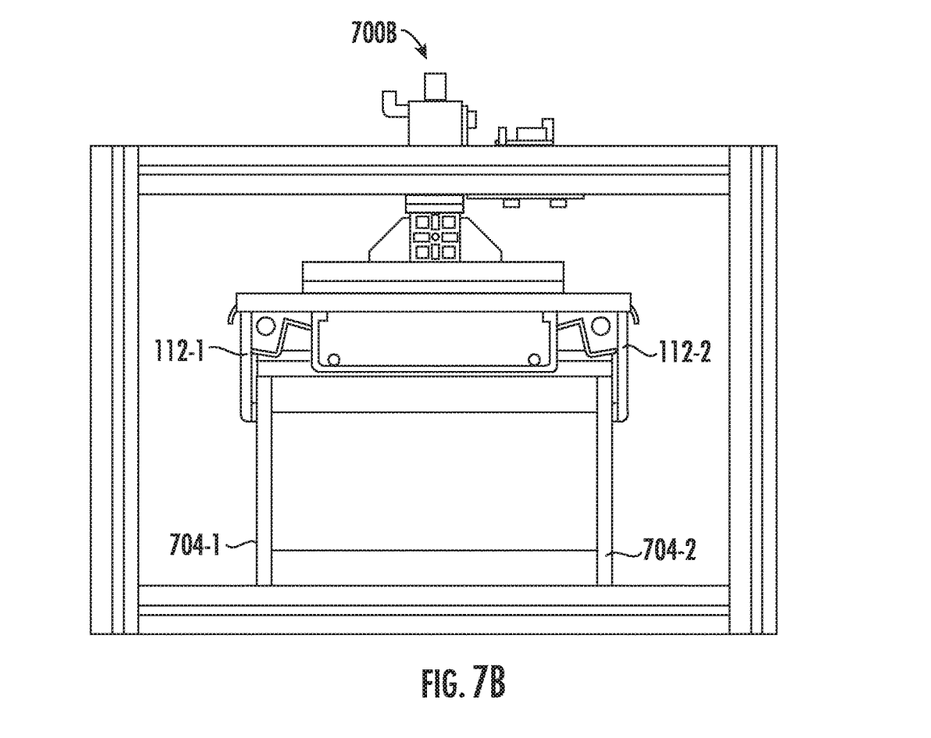

FIGS. 7A and 7B illustrate a tote gripping device 700, for instance, the gripping device 100 and operation of the tote gripping device for gripping a tote, in accordance with some example embodiments described herein. FIG. 7A illustrates a released or open state 700A of a tote gripping device, for instance, the device 100 and FIG. 7B illustrates a closed or locked state of the device 100. As shown, the tote gripping device 100 includes the top plate 104 to which side plates 102-1 and 104-2 are pivotably engaged, for instance, via an engagement mechanism as described in reference to FIGS. 5A and 5B. The tote gripping device 700 may be installed on an actuation unit, for instance a robotic tool 701. In this regard, the robotic tool 701 may correspond to an extension of any of a robotic arm or a conveyor overhead used in a material handling environments for reorienting, repositioning or relocating totes or containers. In this regard, as illustrated, the top plate 104 of the tote gripping device 100 is mechanically engaged or attached with an end of the robotic tool 701. FIG. 7A also illustrates the first engagement element 110-1 and the second engagement element 110-2 defined on the two side plates 102-1 and 102-2 respectively. The first engagement element 110-1 and the second engagement element 110-2 are adapted to engage on one or more respective features such as, but not limited to, slots defined on sides 704-1 and 704-2 of the tote 706, thereby firmly holding the tote 706 between the two side plates 102-1 and 102-2 to prevent any slippage of the tote 706 from the tote gripping device 100. Furthermore, these complementation shapes may be used to lift a tote or container given that at least a portion of the engagement elements are received within slots of the tote (e.g., the tote is not lifted by frictional contact alone).

Referring to FIG. 7A, in the open state 700A, the two side plates 102-1 and 102-2 are opened and a tote 706 is received between the side plates 102-1 and 102-2. Referring to FIG. 7B, a closed state 700B of the tote gripping device 100 is illustrated in which the side plates 102-1 and 102-2 are closed, and the tote is gripped between the two side plates 102-1 and 102-2. In this aspect, as shown, the first engagement element 110-1 and the second engagement element 110-2 are engaged within the one or more respective features defined on the sides 704-1 and 704-2 of the tote 706.

Figure 8:
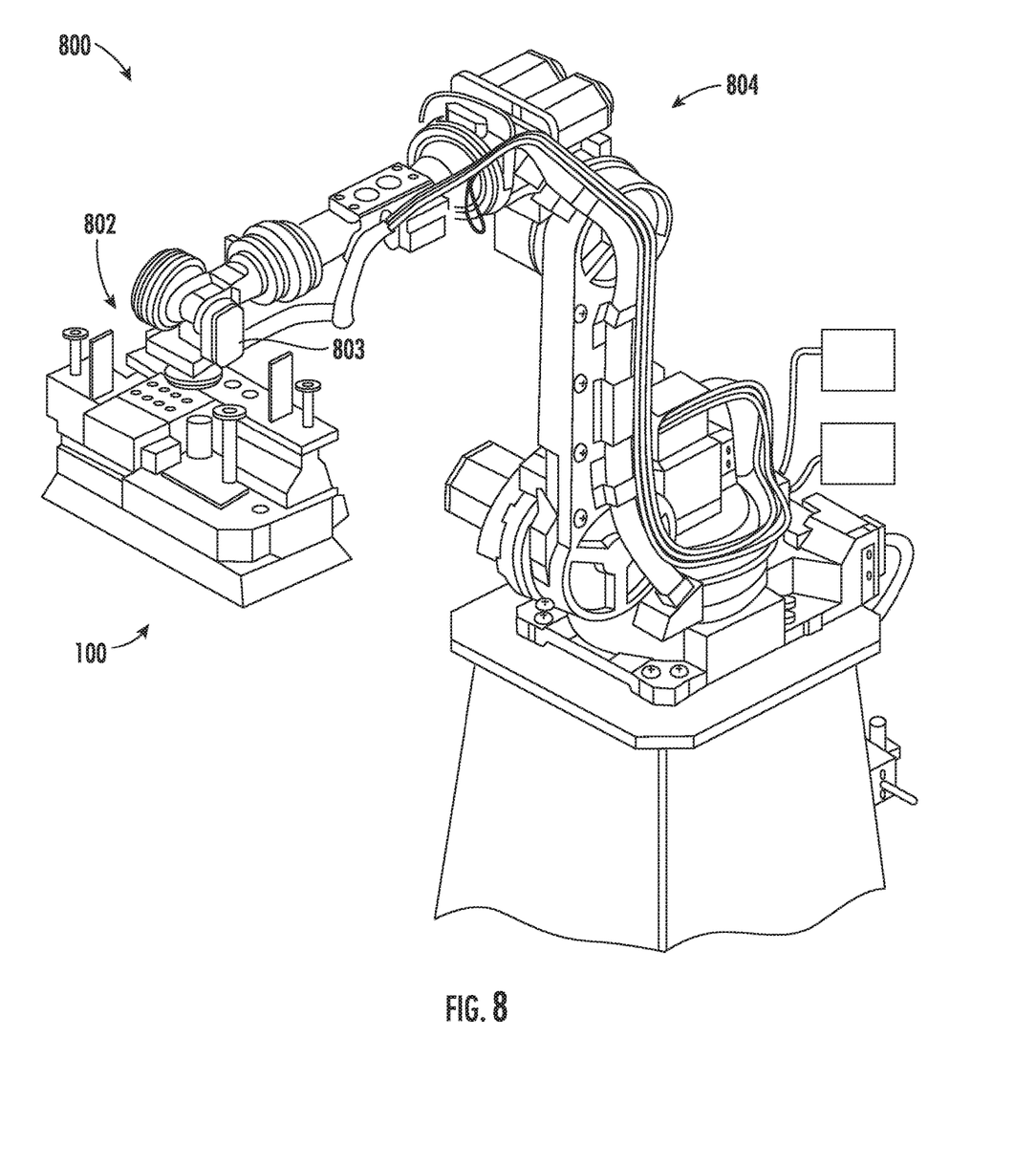
FIG. 8 illustrates an example material handling apparatus that supports the gripping device, described in accordance with various example embodiments herein.

FIG. 8 illustrates an example material handling apparatus 800 used in a material handling environment that supports the gripping device 100, described in accordance with various example embodiments herein. Illustratively, the material handling apparatus 800, includes a robotic tool 802 on which the gripping device 100 may be mounted or installed. In this regard, the robotic tool 802 along with the gripping device 100 is used in a material handling environment such as, but not limited to, a warehouse or a distribution center, for picking or lifting one or more articles from one location and placing the articles at another location. Also, the robotic tool 802 with the gripping device 100 may be used for reorienting or otherwise maneuvering articles. Illustratively, the robotic tool 802 or an end effector is attached to a moving end 803 of a robotic arm 804 that is configured to move the robotic tool 802 to almost any position within a hemispherical reach of robotic arm 804. As will be illustrated later, robotic arm 804 can move robotic tool 802 to a first location to pick up articles by gripping the articles between the side plates 102-1 and 102-2 of the gripping device 100 attached to the robotic tool 802, and can further move the robotic tool 802 along with the articles gripped by the gripping device 100 to a second location. In some example embodiments, the robotic tool 802 may be attached to a conveyor overhead (not shown). The gripping device 100 such as, a tote gripper, may be installed on the robotic tool 802 for gripping totes or similar containers, before lifting the totes by the robotic tool 802 for repositioning or relocating the totes on conveyor systems.

In some example embodiments, certain ones of the operations herein may be modified or further amplified as described below. Moreover, in some embodiments additional optional operations may also be included. It should be appreciated that each of the modifications, optional additions or amplifications described herein may be included with the operations herein either alone or in combination with any others among the features described herein.

As will be appreciated by one of skill in the art the order of steps in the foregoing embodiments may be performed in any order. Words such as "thereafter," "then," "next," etc.

are not intended to limit the order of the steps; these words are simply used to guide the reader through the description of the methods. Further, any reference to claim elements in the singular, for example, using the articles "a," "an" or "the" is not to be construed as limiting the element to the singular.

The hardware used to implement the various illustrative logics, logical blocks, modules, and circuits described in connection with the aspects disclosed herein may include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, or in addition, some steps or methods may be performed by circuitry that is specific to a given function.

In one or more example embodiments, the functions described herein may be implemented by special-purpose hardware or a combination of hardware programmed by firmware or other software. In implementations relying on firmware or other software, the functions may be performed as a result of execution of one or more instructions stored on one or more non-transitory computer-readable media and/or one or more non-transitory processor-readable media. These instructions may be embodied by one or more processor-executable software modules that reside on the one or more non-transitory computer-readable or processor-readable storage media. Non-transitory computer-readable or processor-readable storage media may in this regard comprise any storage media that may be accessed by a computer or a processor. By way of example but not limitation, such non-transitory computer-readable or processor-readable media may include random access memory (RAM), read-only memory (ROM), electrically erasable programmable read-only memory (EEPROM), FLASH memory, disk storage, magnetic storage devices, or the like. Disk storage, as used herein, includes compact disc (CD), laser disc, optical disc, digital versatile disc (DVD), floppy disk, and Blu-Ray Disc™, or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media may be referred to herein as a computer program product.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the supply management system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

The invention claimed is:

1. A gripping device comprising:
a top plate defining at least a first end and a second end;
a first side plate attached to the first end of the top plate, wherein the first side plate comprises a first engaging element;
a second side plate attached to the second end of the top plate, wherein the second side plate comprises a second engagement element;
a first arm engaged with the first side plate, wherein the first arm defines a first cam slot;
a second arm engaged with the second side plate, wherein the second arm defines a second cam slot;
a driving pin defining a first portion configured to engage an actuation assembly and a second portion disposed within the first cam slot and the second cam slot; and
wherein, in response to an input from the actuation assembly, the driving pin is configured to move between a first position and a second position within the first cam slot and the second cam slot so as to drive movement of the first side plate and the second side plate between an open position and a closed position, wherein in the closed position the first engaging element and the second engaging element are configured to engage a container.

2. The gripping device according to claim 1, wherein the first side plate and the second side plate are each hingedly connected with the first end of the top plate and the second end of the top plate, respectively.

3. The gripping device according to claim 1, wherein at least a portion of the first cam slot overlaps with at least a portion of the second cam slot.

4. The gripping device according to claim 1, wherein movement of the driving pin between the first position and the second position is configured to swing the first side plate and the second side plate inwardly towards each other so as to grip the container.

5. The gripping device according to claim 1, wherein movement of the driving pin between the second position and the first position is configured to swing the first side plate and the second side plate outwardly so as to release the container.

6. The gripping device according to claim 1, wherein the driving pin is configured to engage the actuation assembly comprising at least a Geneva electric drive and a Geneva indexer wheel.

7. The gripping device according to claim 1, wherein the first portion of the driving pin is configured to engage to a pin actuation unit of the actuation assembly.

8. The gripping device according to claim 1, wherein the gripping device is configured, via the top plate, to engage a robotic arm or a conveyor overhead so as to lift the container.

9. The gripping device according to claim 1, wherein the first position corresponds to a lower end of the first cam slot and an upper end of the second cam slot, and wherein the second position corresponds to an upper end of the first cam slot and a lower end of the second cam slot.

10. The gripping device according to claim 1, wherein the first engagement element and the second engagement element are configured to complement to a corresponding shape of the container.

11. The gripping device according to claim 1, further comprising, a switching element coupled to at least two sensing elements to sense one of: an open state or a closed state of the first side plate and the second side plate of the gripping device.

12. A device for gripping a container comprising:
an electric indexing unit comprising an indexer unit;
a first side plate comprising a first engaging element;
a second side plate comprising a second engaging element;
a first arm engaged with the first side plate, the first arm defining a first cam slot;
a second arm engaged with the second side plate, the second arm defining a second cam slot; and
a driving pin defining a first end engaged with the indexer unit of the electric indexing unit and a second end disposed within the first cam slot and the second cam slot,
wherein the electric indexing unit is configured to drive movement of the driving pin between a first position and a second position within at least a portion of the first cam slot and the second cam slot so as to drive movement of the first side plate and the second side plate between an open position and a closed position, wherein in the closed position the first engaging element and the second engaging element are configured to engage a container.

13. The device according to claim 12, further comprising a top plate, wherein the top plate defines:
a first end pivotally engaged with the first side plate; and
a second end pivotably engaged with the second side plate.

14. The device according to claim 12, wherein the electric indexing unit further comprises:
a cam wheel; and
a motor electrically coupled to the cam wheel and configured to drive rotation of the cam wheel,
wherein the indexer unit further comprises an indexer wheel and a pin actuation unit engaged with the indexer wheel.

15. The device according to claim 14, wherein the electric indexing unit comprises a Geneva electric drive and the indexer wheel comprises a Geneva indexer wheel.

16. The device according to claim 14, wherein the first end of the driving pin is engaged with the pin actuation unit, and wherein the pin actuation unit is configured to rotate with the indexer wheel based on the rotation of the cam wheel so as to drive movement of the driving pin between the first position and the second position.

17. The device according to claim 14, wherein the cam wheel comprises an indexing pin and an elevated circular disc having an orientation arc, and wherein the indexing pin of the cam wheel is configured to be received within an indexing slot of the indexer wheel based on the rotation of the cam wheel and wherein, in an instance in which the indexing pin is within the indexing slot of the indexer wheel, rotation of the cam wheel is configured to cause rotation of the indexer wheel along with the pin actuation unit so as to move the driving pin between the first position and the second position.

18. The device according to claim 12, wherein the first position corresponds to a lower end of the first cam slot and an upper end of the second cam slot, and wherein the second position corresponds to an upper end of the first cam slot and a lower end of the second cam slot.

19. The device according to claim 13, wherein the device is configured, via the top plate, to engage a robotic arm or a conveyor overhead so as to lift the container.

20. The device according to claim 12, further comprising a switching element coupled to at least two sensing elements and configured to sense an open state or a closed state of the first side plate and the second side plate of the device.

* * * * *